July 2, 1957 H. A. FINKE 2,798,161

RADIO WAVE COMBINATION TUNERS

Filed Sept. 16, 1952

INVENTOR
Herbert A. Finke
BY Ralph B. Stewart
ATTORNEY 2,798,161
Patented July 2, 1957

2,798,161

RADIO WAVE COMBINATION TUNERS

Herbert A. Finke, Brooklyn, N. Y., assignor to Polytechnic Research & Development Co., Inc., Brooklyn, N. Y., a corporation of New York Application September 16, 1952, Serial No. 309,899

4 Claims. (Cl. 250—40)

Figures 1, 2:
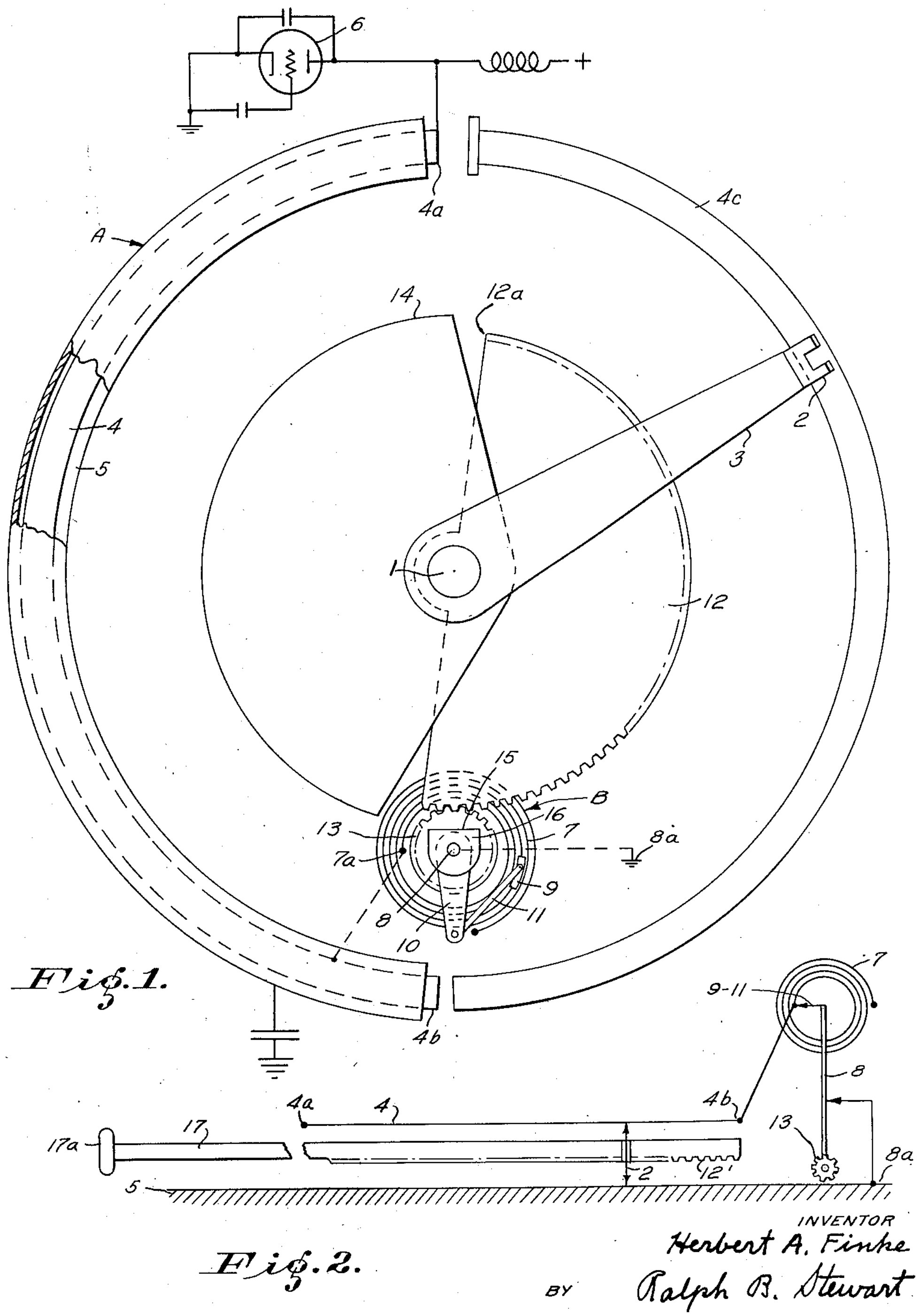

This invention relates to radio tuners especially useful in the very high frequency and ultra high frequency bands.

While the tuner has been designed especially for use in an oscillator for generating high frequency waves within the tuning range, it is not limited to this use and may be employed in other applications requiring a variable tuned circuit.

A broad object of the invention is to devise a tuner capable of covering a wide range of frequencies and using a single control member which moves through a limited range of movement.

In one form of my invention, I find it possible to cover a frequency range from 35 megacycles to 900 megacycles using a single tuning shaft rotating through less than a full revolution.

My improved combination tuner involves the use of two tuners of different types operated from a common movable member, one tuner covering the high frequency portion of the tuning range and the other covering the low frequency portion of the range.

A more specific object of my invention is to devise an arrangement for controlling two variable inductances from a common operating member so that they are operated or varied in succession, that is, one variable inductance is operated by the operating member in moving through one portion of its range of movement, while the other variable inductance is operated by the operating member in moving through the remaining portion of its range of movement.

For covering the high frequency range of the tuner, I employ a variable inductance of the type formed of a linear conductor or line having uniformly distributed inductance and capacitance, and the low frequency portion of the tuning range is covered by a variable inductance formed of a coiled conductor having a number of convolutions. These two variable inductances are connected in series between a terminal and ground or between two terminals. Both inductances are provided with sliding contacts for varying the amount of the inductance included in the circuit between the two terminals. In operation, the tuning or operating member first operates the sliding contact on the linear conductor to insert an increasing amount of this conductor in the circuit, the coiled inductance being completely out of the circuit or being short-circuited during this range of operation. After the entire amount of the linear inductance is included in the circuit, the contact on the coiled inductance is then operated by the tuning member to insert an increasing amount of the coiled inductance in the circuit.

My invention is illustrated in the accompanying drawing in which Fig. 1 is a diagrammatic representation of the preferred form of tuner embodied in an electron tube oscillator circuit, and Fig. 2 is a diagrammatic showing of a second form of the tuner.

Referring to Fig. 1, the section of the tuner covering the high frequency range is formed of a section of coaxial line indicated generally at A, and the section of the tuner covering the low frequency part of the tuning range is formed of a spiral inductance indicated generally at B. The coaxial line section A is formed in a circular arc about the axis of the tuning shaft 1, and its outer conductor is provided with a longitudinal slot opening towards the shaft for receiving a short-circuiting slider 2, carried on the end of arm 3 formed of insulating material and mounted on shaft 1. The slider 2 enters the space between the center conductor 4 and the outer conductor 5 of the coaxial cable and establishes a short-circuit or bridge connection between these two conductors, thus varying the effective length of the cable from the slider to either end of the cable. One end 4*a* of the center conductor 4 is connected to the anode of an electron tube 6, the remaining electrodes of which are connected to form an oscillation generating circuit of the well-known Colpitts type, although any other suitable form of circuit may be employed. The frequency of the generated oscillations is inversely proportioned to the length of the line from end 4*a* to the slider 2 when the slider is operating in section A of the tuner.

The other end 4*b* of line conductor 4 is connected to the inner end of the spiral conductor 7 forming section B of the tuner. Conductor 7 is spiralled about the axis of shaft 8 which is grounded as represented at 8*a*. A sliding contact 9 is mounted to slide along conductor 7 and is operated from the shaft 8 by means of an arm 10 mounted on the shaft and connected to the slider 9 through a pivoted link 11. This construction was selected merely for the purpose of illustration, and any other suitable arrangement for operating the sliding contact may be employed, such as shown in Figs. 9 to 11 of the patent to Ware, 2,163,645. Also, while I prefer to form the B section of the tuner as a spiral inductance as shown in Fig. 1, this section may assume the form of a helical inductance of a well-known type, such as illustrated in Figs. 1 and 2 of the above-mentioned Ware patent.

The operating shaft 8 of section B of the tuner is driven from the operating shaft 1 by means of a segmental gear 12 mounted on the shaft 1 and engaging pinion 13 carried by the shaft 8. The arrangement is such that the gear 12 is disengaged from the pinion 13 throughout the range of movement of shaft 1 where the slider 2 is in engagement with the coaxial line forming section A of the tuner. The gear 12 is so mounted that it engages the pinion 13 at the point 12*a* when the slider 2 moves out of engagement with the end 4*b* of the conductor 4. Continued counterclockwise movement of the arm 3 rotates the shaft 8 in a clockwise direction and thereby moves the slider 9 in a clockwise direction to include more and more of the spiral conductor 7 in the circuit between the terminal 4*a* and the terminal 8*a*. The shaft 8 is conductively connected to the slider 9 through the arm 10 and the link 11. When the gear 12 is operated in a clockwise direction, the shaft 8 rotates in an anti-clockwise direction, and when the gear disengages the pinion at the point 12*a* on the gear, the slider 9 is located at the inner end 7*a* of the spiral conductor 7. At this point a locking disc 14 mounted on the shaft 1 moves into locking engagement with the flat face 15 of a dog 16 carried by the shaft 8. The peripheral edge of disc 14 maintains locking engagement with the face 15 throughout the range of movement of the slider 2 in section A of the tuner. This prevents movement of the slider 9 from the point 7*a* in the spiral section except when the gear 12 is in engagement with pinion 13. The track section 4*c* for slider 2 is formed of any hard material to resist wear from the sliding movement and does not enter into the electrical operation of the tuner.

In one embodiment of my invention according to Fig.

1, section A of the tuner covers frequencies from 900 megacycles down to 150 megacycles, and section B covers from 150 megacycles down to 35 megacycles.

It is not necessary to form section A of the tuner in an arcuate form but it may be arranged in a straight line form as shown in Fig. 2 where the same reference numerals indicate corresponding parts shown in Fig. 1. In this arrangement, the center conductor 4 of the coaxial cable is arranged in a straight line and the short-circuiting slider 2, instead of being operated from a rotary shaft, is operated from a sliding bar 17 carrying an operating handle 17*a* on the outer end thereof.

The bar 17 is movable throughout a predetermined range of movement to shift the slider 2 from the end 4*a* of the line 4 throughout the length of line 4 and beyond the end 4*b* a distance sufficient to operate the B section of the tuner which is formed of the same spiral inductance as in Fig. 1. In this case, the bar 17 carries a toothed rack 12′ arranged to engage and operate the pinion 13 for the same purpose as the gear 12 in Fig. 1. The end of the rack 12′ engages the pinion 13 when the slider 2 is at the point to move away from the end 4*b* of the line 4. In this case also the shaft 8 may be provided with a locking dog for locking the sliding contact 9—11 in its zero position by means of a locking bar carried by the sliding bar 17.

In both forms of my invention the movable operating member is arranged to insert the tuning conductor of section A into the circuit at a predetermined rate, and the rate of insertion of the tuner conductor in the circuit is greatly increased in section B of the tuner for the same rate of movement of the operating member. This produces a more linear relation between the movement of the operating member and the frequency of the tuned circuit. In Fig. 1 this is accomplished by means of a speed multiplying gear train connected between the tuning shaft 1 and the shaft 8 to produce a number of revolutions of the shaft 8 for an angular movement of the shaft 1 through less than 180 degrees. In Fig. 2, the rectilinear movement of the bar 17 is converted into rotary movement of the shaft 8 when the tuner is operating in section B. While it is possible to employ other forms of coiled inductance in section B of the tuner, I prefer to use a spiral inductance for the reason that, for a given rate of rotation for the shaft 8, the amount of conductor 7 inserted in the circuit progressively increases as the slider 9 proceeds from the inner end 7*a* of the conductor to the outer end of the spiral. An indicator dial may be carried by shaft 1 and marked in frequency or wavelength. A graduated scale may also be mounted on or located adjacent the bar 17 for indicating frequency or wavelength.

In the appended claims the term "linear conductor" is used to apply to a conductor having uniformly distributed inductance and capacitance as distinguished from a coiled conductor formed of a number of turns or convolutions. This term is applied to the conductor in section A of the tuner in both figures of the drawing.

What I claim is:

1. In a radio wave tuner, the combination of a linear conductor having a sliding contact movable throughout the length thereof, a coiled conductor having a number of convolutions and a sliding contact movable throughout said convolutions, a rotary shaft movable through a limited angular movement of substantially one revolution, means controlled by said shaft over only a fraction of its range of movement for moving the slider on said linear conductor throughout its range of movement, and means controlled by said shaft during the remaining angular movement through said one revolution for moving the sliding contact of said coiled conductor throughout its range of movement.

2. A radio wave tuner according to claim 1 wherein said coiled conductor is in the form of a flat spiral and the inner end of said spiral is connected to one end of said linear conductor.

3. In a radio wave tuner, the combination of a rotary shaft, a first variable inductance comprising a linear conductor arranged in an arcuate path about said rotary shaft and covering an arc of only a portion of a complete circle, a sliding contact engaging said linear conductor and mounted for rotation with said rotary shaft, a second rotary shaft arranged parallel with said first shaft and spaced therefrom, a second variable inductance comprising a conductor coiled about the axis of said second shaft in a number of convolutions, a second sliding contact engaging said coiled conductor and mounted for rotation by said second shaft, a pinion mounted on said second shaft, a segmental gear carried by said first shaft and positioned to engage said pinion when said first sliding contact is in a position to move away from one end of said linear conductor, said segmental gear operating to turn said second shaft through a number of revolutions while said first sliding contact rotates through the remaining angular portion of said circle, and means for interlocking said shafts to prevent turning of said second shaft when said first contact is in engagement with said linear conductor.

4. A tuner according to claim 3 wherein both of said sliding contacts are grounded, said coiled conductor being formed as a flat spiral, and the inner end of the spiral being connected to one end of said linear conductor.

References Cited in the file of this patent

UNITED STATES PATENTS

| | | |
|---|---|---|
| 1,339,772 | Lowenstein | May 11, 1920 |
| 1,643,782 | Loewe | Sept. 27, 1927 |
| 2,126,541 | De Forest | Aug. 9, 1938 |
| 2,163,645 | Ware | June 27, 1939 |
| 2,498,529 | Clark | Feb. 21, 1950 |
| 2,543,560 | Thias | Feb. 27, 1951 |
| 2,694,150 | Bussard | Nov. 9, 1954 |